United States Patent [19]

Hansen et al.

[11] 4,013,018

[45] Mar. 22, 1977

[54] PNEUMATIC SHIPPING ENCLOSURES

[75] Inventors: Ralph C. Hansen, Toledo; Ray P. Miles, Macedonia, both of Ohio

[73] Assignee: Libbey-Owens-Ford Company, Toledo, Ohio

[22] Filed: Jan. 20, 1975

[21] Appl. No.: 542,461

[52] U.S. Cl. .............................. 105/468; 206/522; 52/2; 105/367; 105/377; 105/489; 214/10.5 D; 296/100

[51] Int. Cl.² ...................... B60P 7/04; B60P 7/10; B60P 7/16; B61D 45/00

[58] Field of Search .......... 105/377, 468, 492, 496, 105/367, 368 R, 489; 214/10.5 D; 220/552; 52/2; 296/100, 137 B

[56] References Cited

UNITED STATES PATENTS

| | | | |
|---|---|---|---|
| 468,455 | 2/1892 | Giessmann | 52/2 |
| 2,028,060 | 1/1936 | Gilbert | 52/2 |
| 2,411,316 | 11/1946 | Capita | 52/2 |
| 2,674,206 | 4/1954 | Scott | 206/522 X |
| 2,764,950 | 10/1956 | Finnell | 105/468 |
| 2,856,867 | 10/1958 | Dasey | 206/522 X |
| 2,863,467 | 12/1958 | Hearell | 52/2 |
| 2,922,344 | 1/1960 | Meissner | 206/522 |
| 2,940,402 | 6/1960 | Hansen et al. | 105/367 |
| 2,943,760 | 7/1960 | Hamilton | 296/100 X |
| 3,079,874 | 3/1963 | Hansen et al. | 105/367 |
| 3,442,402 | 5/1969 | Baxter | 214/10.5 D X |
| 3,596,755 | 8/1971 | Bundy | 105/492 |
| 3,847,091 | 11/1974 | Holt | 105/468 |

*Primary Examiner*—Robert J. Spar
*Assistant Examiner*—Howard Beltran
*Attorney, Agent, or Firm*—Collins, Oberlin & Darr

[57] ABSTRACT

Air inflated covers for protecting merchandise, including glass, lumber and other building materials, during transportation on carriers such as open railroad cars and trucks; with means for connecting sections of the covers together and for anchoring the covers to the carrier.

4 Claims, 11 Drawing Figures

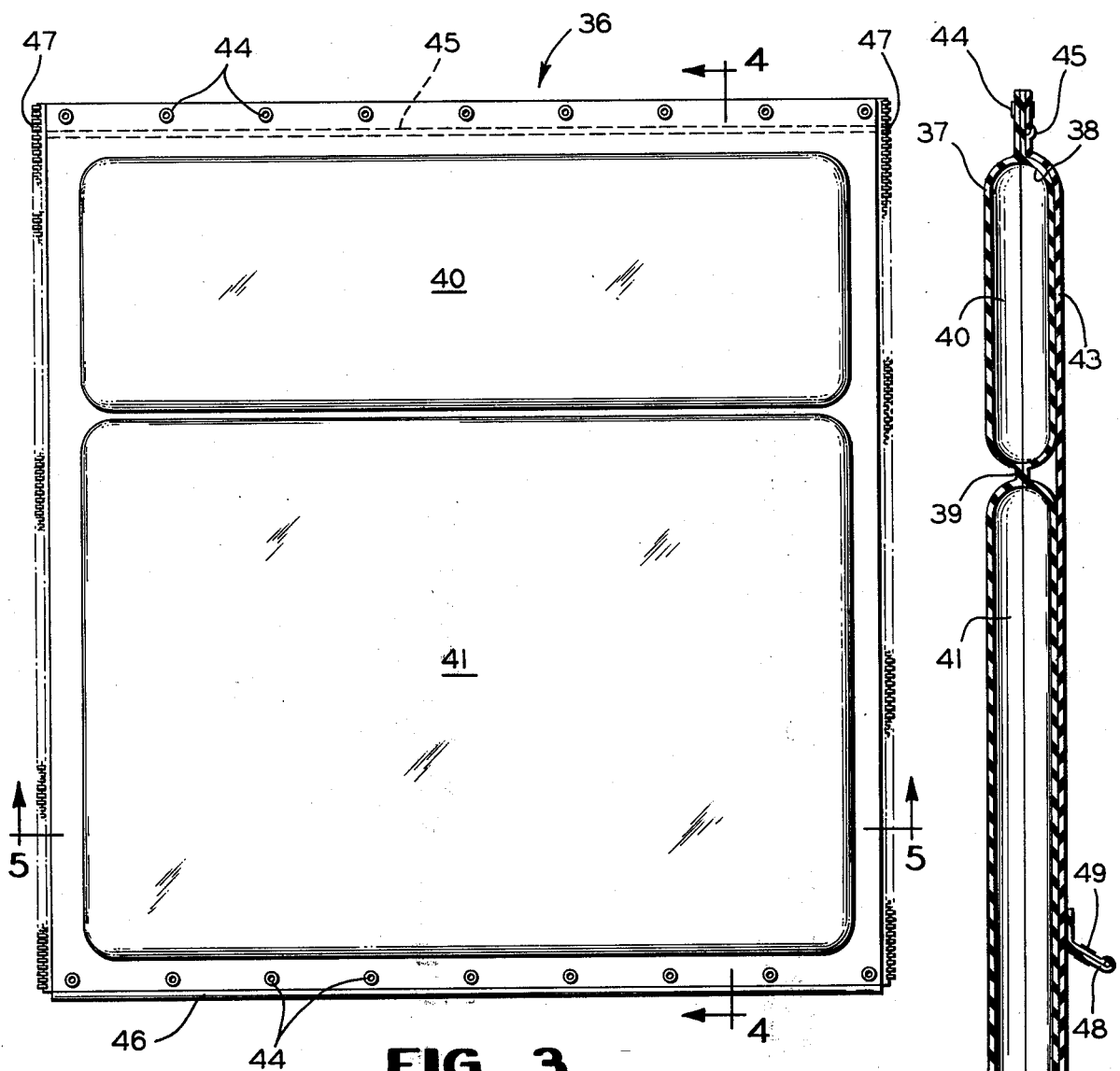

PNEUMATIC SHIPPING ENCLOSURES

BACKGROUND

1. Field of the Invention

The present invention relates broadly to the art of handling and shipping; and, more particularly, to an improved form of protective covering of a pneumatic type and for use in combination with a basic supporting structure upon which merchandise of all kinds may be moved.

Although in no way restricted thereto, the pneumatic, or air inflated or inflatable, cover of the invention has already demonstrated its value and effectiveness in connection with the storing and shipping of such fragile and hard to handle articles as large sheets or plates of glass.

2. Description of the Prior Art

Heretofore the protective shipment of glass sheets has required special boxing, or incorporating of the sheets into unitized packages or loads, usually for shipment in box cars or in enclosed trucks. Where covering material was employed, it was usually in the form of plastic sheeting which was applied either as a wrapping or by a so-called drape and tuck procedure. Moreover, because large sheets or plates of glass may be of a length as great as two thirds that of a standard railroad car, and of a width substantially equal to or in excess of that of such a car, shipment has sometimes required the provision of specially built or modified railroad cars, such as illustrated and described in U.S. Pat. Nos. 2,940,402 and 3,079,874, to effectively accommodate and transport them.

SUMMARY OF THE INVENTION

On the other hand, the inflatable cover of the present invention makes possible the protective shipping of extremely large glass sheets, as well as other kinds of frangible, perishable or otherwise hard to handle merchandise, in conventional, readily available, gondolas, flat cars or open trucks.

Therefore, it is an important object of the invention to provide a pneumatic cover of special construction which, in combination with standard supporting, vehicular, or other base elements, provides an adequate protective enclosure for use in storing, shipping or handling merchandise of practically any kind, size or shape.

Another object is the provision of a structure of this character in which the air inflated cover can be quickly and expeditiously applied to and removed from the base element with a minimum of risk to the merchandise supported thereon.

Another object is to provide such an air inflated cover that is designed to protect the materials it covers from the elements and also against physical damage from other outside forces.

Still another object is the provision of a pneumatic or air inflatable protective cover which also permits adequate air circulation between itself and the goods it covers.

Further objects and advantages will become apparent during the course of the following description, when taken in connection with the accompanying drawings.

BRIEF DESCRIPTION OF THE DRAWINGS

In the drawings, wherein like numerals refer to like parts throughout:

FIG. 3 is a view of one of the sections of the cover of FIG. 1 in the flat;

FIG. 4 is a transverse, sectional view taken substantially along the line 4—4, in FIG. 3;

FIG. 5 is a transverse, sectional view taken substantially along the line 5—5, in FIG. 3;

DESCRIPTION OF PREFERRED EMBODIMENTS

Although as indicated above, the apparatus including the pneumatic cover of the invention is well adapted for protective use in the storing, packing and shipping of a wide variety of goods, in or on various kinds of stationary or movable facilities and equipment, it has to date proven to be especially valuable in connection with the shipping of large sheets or plates of glass in railway cars, and it will be specifically described in that connection here.

To appreciate some of the problems involved in such shipping, it must be understood that, while glass has been shipped by rail for many years and the shipping of it for long distances in boxes and unitized packages and in conventional box cars is old and well known, this involves considerable expense and definitely limits the sizes of sheets that can be accommodated.

On the other hand the present invention permits the shipment, under fully protected conditions, of glass sheets in any width that can be produced on currently available glass making equipment, and in any length within that of a normal railway car of any kind.

Figure 1:
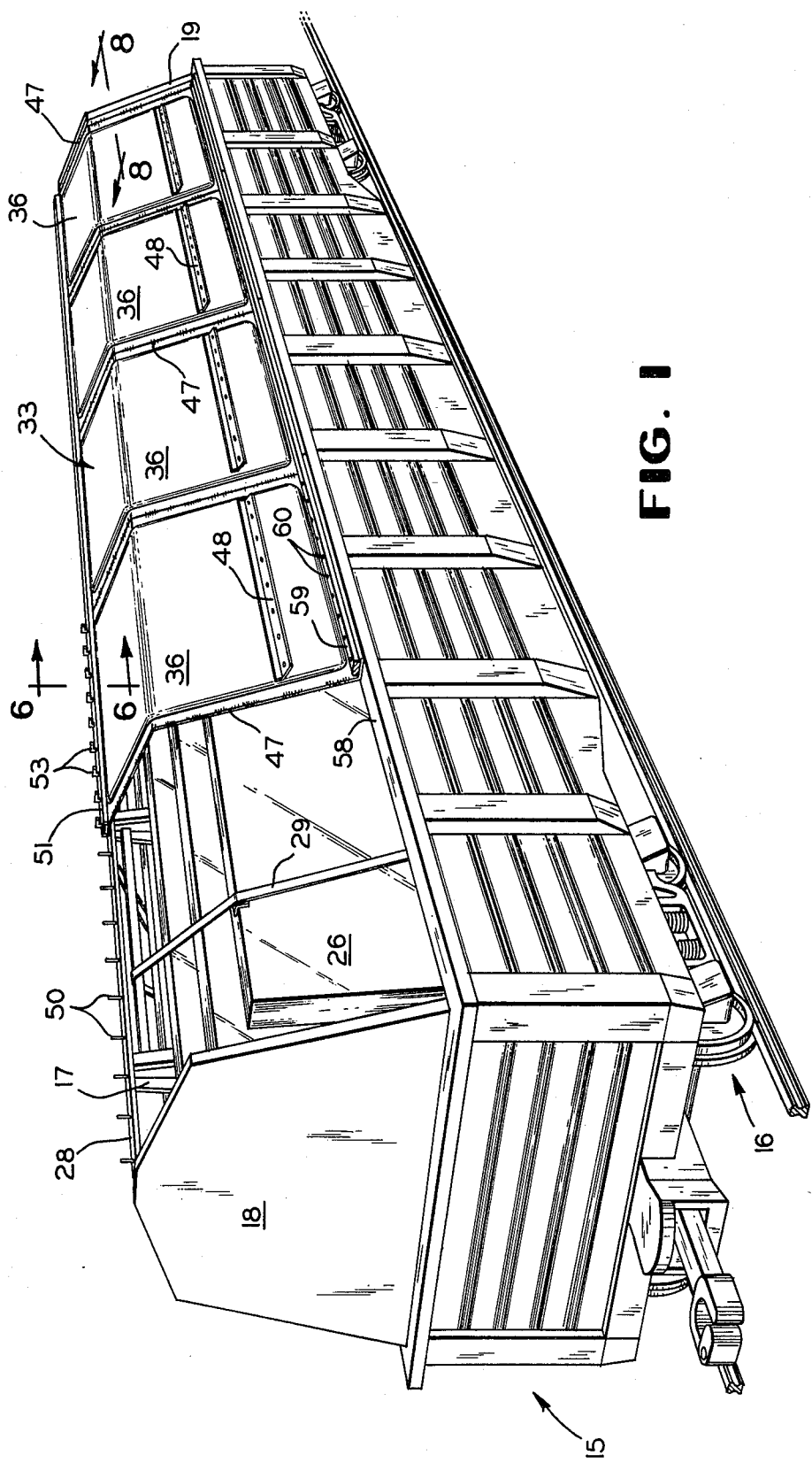
FIG. 1 is a perspective view of a gondola type railroad car equipped to ship large sheets or plates of glass, and showing sections of a preferred form of the cover of the invention in place.
Figure 2:
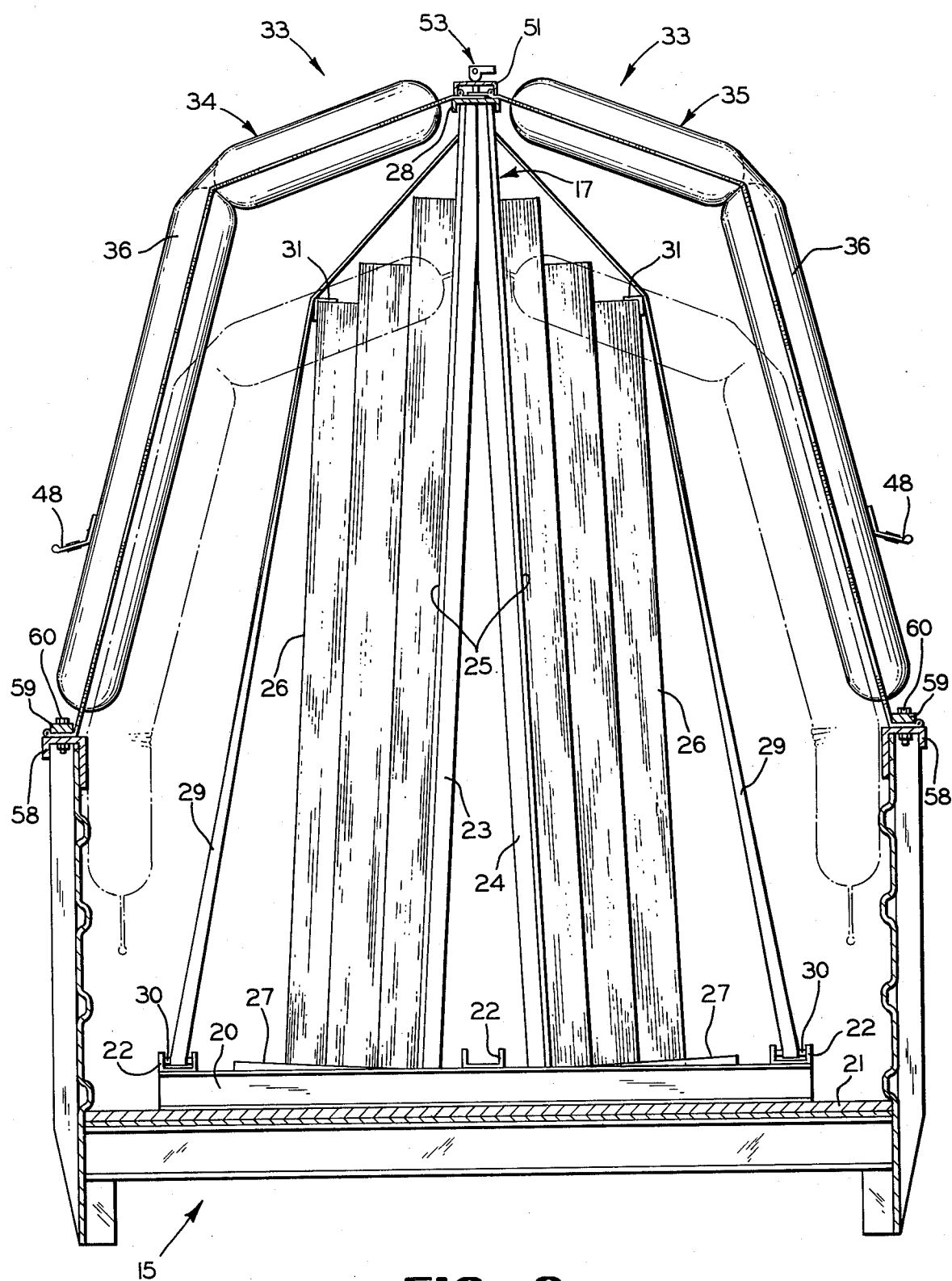
FIG. 2 is a transverse, vertical, sectional view through the body of the railway car and the protective cover of FIG. 1, illustrating optional positions of the cover in full and in broken lines.

For example, everyone is familiar with the conventional, so-called, gondola type railway car which, as shown in FIG. 1 and FIG. 2, resembles a relatively shallow, rectangular, box-like structure 15, mounted on wheels or trucks 16 and open at the top. To adapt this type of car to the invention it is only necessary to provide a suitable support 17 for the glass sheets, and bulkheads 18 and 19 at opposite ends of the car that conform generally in outline shape with the cross sectional contour of the support 17.

As here shown, the support 17 is a so-called "A" frame. This is a form of supporting structure that is well known and widely used in the flat glass industry and takes its name from its cross sectional shape. While it may be made up in various ways and of any desired materials, it is here depicted as having a base comprising a series of parallel "I" beams 20 on, and running transversely of, the floor 21 of the car 15; with channel irons 22 that run at right angles to and secure the "I" beams together. Upright members 23 and 24 extend vertically upward from the "I" beams in converging relationship to provide angled supporting surfaces 25 against which glass sheets 26 can rest when mounted on the resulting "A" frame. To support the edges of the glass sheets on the frame, blocks 27, carried by the beams 20, are provided with upper surfaces that slope downwardly and inwardly toward the surfaces 25 to provide an approximately 90° angle therewith.

The "A" frame 17 may be made up as one single unit, extending the full length of the car 15, or it may be made in sections of any desired length that, together, completely fill, or occupy any specified part of, the car's capacity; and the frame or frame sections may be secured to, or be blocked or wedged in place on the car floor.

As shown in FIG. 1, the bulkheads 18 and 19 are generally similar in contour and height, but somewhat wider, than the "A" frame 17. They may be of any desired material, have their lower portions secured to the end walls of the car by any suitable means, and be held in spaced, substantially parallel relationship by a main support and spacer 28 in the form of an inverted channel iron which may or may not rest on and/or be secured to the top of the "A" frame.

When so equipped, the car 15 is ready for loading and, since it is completely open at the top, glass sheets 26 can be readily and easily stacked in position on opposite sides of the "A" frame 17 by practically any available type of conveying and transfer apparatus, and prevented from sliding or shifting thereon by suitable banding straps 29 or the like.

As shown, the banding straps 29 pass from pins 30 in the channels 22 over the top of the "A" frame, contacting on the way the corners of the glass sheets 26 in the outer stoces, which are covered by so-called "pig trough" type edge protectors 31. However various types of banding and securing equipment may be employed either individually or collectively to anchor the "A" frame to the car and/or to hold the glass on the "A" frame.

Once the glass plates have been stacked and secured in place on the "A" frame, covers 33 of the invention can be located thereover fastened down and then inflated to completely enclose and effectively protect the glass from chemical or physical harm regardless of climatic conditions, during long and involved switching and travel, and from many unanticipated hazards.

The covers 33 may be applied as a unitary structure or as dual structures, and in any number of individual sections; and they may be inflated either before or after being applied. In one preferred embodiment, illustrated in FIG. 1, they may be said to be in both dual, and in individual sectional, form, in that each of two cover parts or halves 34 and 35, at opposite sides of the car 17, are also divided into individual sections 36. Each of these sections 36, as best shown in FIGS. 3 to 5 and 9, is made up of two flexible sheets 37 and 38 of rubber or plastic that are sealed together at their margins, and along a narrow area 39 transversely thereof, to provide upper and lower compartments 40 and 41 between the sheets that can be inflated, as through valves 42 or the like; and a third flexible sheet 43 of substantially the same area as the others is bonded to the margins and most of the surface of the outer sheet 38 except in the area of the strip 39 which it bridges. In producing the cover sections 36, holes are punched through the three sheets at spaced intervals along their upper and lower margins and fitted with metal grommets or eyelets as at 44; while one rope core 45 is incorporated between the flexible sheets at the extremity of the lower margin of the section, and another core 46 is interposed between the flexible sheets along a line inwardly of the grommeted holes 44 in the upper margin; and zipper components 47 are secured along the edges of the opposite side margins.

There may also be secured to the flexible sheet 43, or the outer surface, of each section 36, upwardly of its lower margin, a flap 48 which extends outwardly from the section, has a series of grommet equipped holes 49 uniformly spaced throughout its length, and includes a rope core in its outer edge.

It will be understood that the upper and lower inflatable compartments 40 and 41 of the sections 36 can be divided into two or a multiplicity of smaller compartments by sealing the sheets 37 and 38 together along vertical lines in a manner similar to that by which the sealed horizontal area 39 creates the upper and lower compartments. Similarly, the single lone flap 48 may be replaced by a plurality of special individual flaps extending in a series across the section.

In applying the cover of the invention to a gondola 15, that has been equipped with an "A" frame 17 and loaded with glass plates 26, a sufficient number of sections 36 to extend the length of the car on both sides of the "A" frame 17 are provided, and each section 36 is hung or draped from an aligned series of spaced posts 50 extending upwardly from the web of the inverted spacer channel 28 (FIGS. 6 and 7) by inserting the posts 50 into the grommeted holes 44 along the upper margins of the cover sections. These upper margins of the sections may then be secured in place by means of an inverted channel shaped clamp member 51 provided with openings 52 along the length of its web that fit over corresponding posts 50 and allow the legs of the channel shaped member 51 to engage the upper overlapping margins of the sections 36 just beyond their incorporated rope cores 45.

Thereafter a forked, cam type lock member 53 having openings 54 therein is fitted loosely over each of the posts 50 and a pin 55 is passed through the holes 54 in the lock members and a corresponding hole 56 in the posts 50. At this time the lock member 53 with its handle 57 raised (broken lines in FIG. 6), will have its cam in contact with the web of the channel member 51; and, upon lowering of the handle 57 in the direction of the arrow, the cam of the member 53 will act to press and lock the upper margins of the sections 36 tightly against the main spacer channel 28.

When so draped, the lower inflatable compartment of each section 36 of the pneumatic cover will swing downwardly, about its respective transversely sealed area 39 as a hinge, to bring its lower margin in position to permit it to be secured to an inverted channel shaped member 58 at, or forming, the top edge of the car 15 (full lines in FIG. 2). This may be done in any suitable manner, such as by clamping the lower margins of the sections 36 between the web of the channel member 58 and a longitudinally extending bar 59, with the enlarged portion resulting from the core 46 outwardly of the bar and using the bolts 60. Alternatively, as shown in broken lines in FIG. 2, the sections 36 can be adapted to provide a cover for a load of lesser height by merely sliding the lower parts of the lower compartments 41 downwardly into the car, where they can serve as cushions against the inner car wall, and clamping the flaps 48 between the bars 59 and channel members 58 instead of the lower margin of the section.

Figure 8:
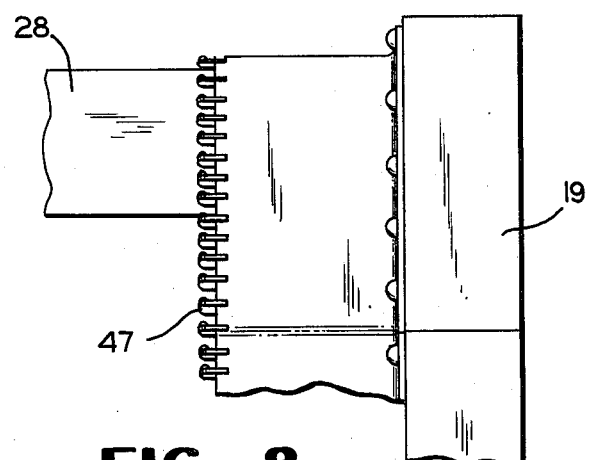
FIG. 8 is a transverse, sectional view taken substantially along the line 8—8 in FIG. 1.
Figure 9:
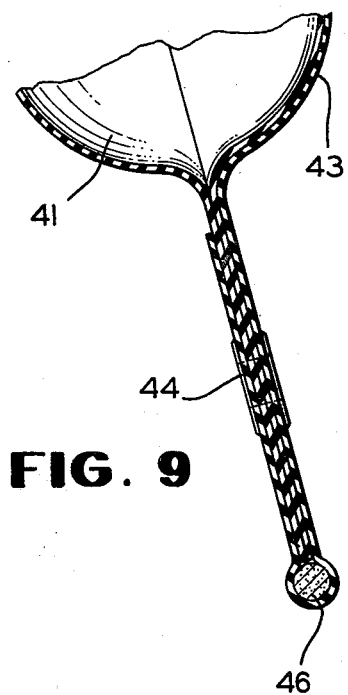
FIG. 9 is a vertical, sectional view through the lower marginal area of the cover of FIG. 1.

In either event, it then only remains to activate the zipper components at the vertical edges of each of the sections 36 to tightly connect them together and, as best shown in FIG. 8, a flap with a similar zipper component is secured to the edges of each of the bulk heads 18 and 19 so that the four end sections 36 can be zipped into interlocking engagement therewith and so make a tight joinder with the bulkheads at the ends of the car. When this has been done, and the compartments 40 and 41 inflated, an enclosure, including a pneumatic or air inflated protective cover, is provided that is completely adequate to protect the glass sheets 26 from the weather and that will, at the same time, serve to cushion them against any possibility of physical damage that could normally be expected to occur. Also, despite the completeness and weather tightness of the protection afforded, the resulting enclosure still leaves ample space and facilities for the free circulation of air. This is particularly important in the shipment of glass, where staining from the chemical action of moisture is a distinct hazard, and where it can as well result from condensation as from leaks during a rainstorm.

Figure 6:
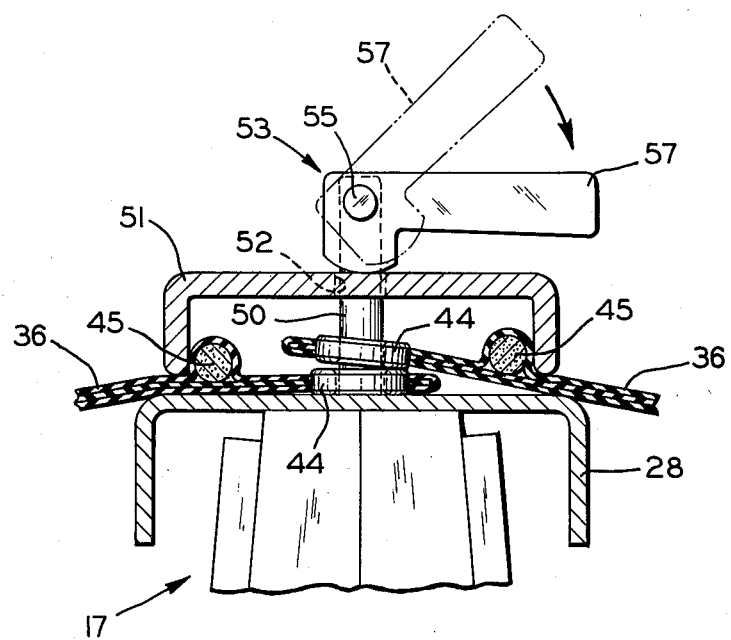
FIG. 6 is a transverse, sectional view taken substantially along the line 6—6 in FIG. 1.
Figure 7:
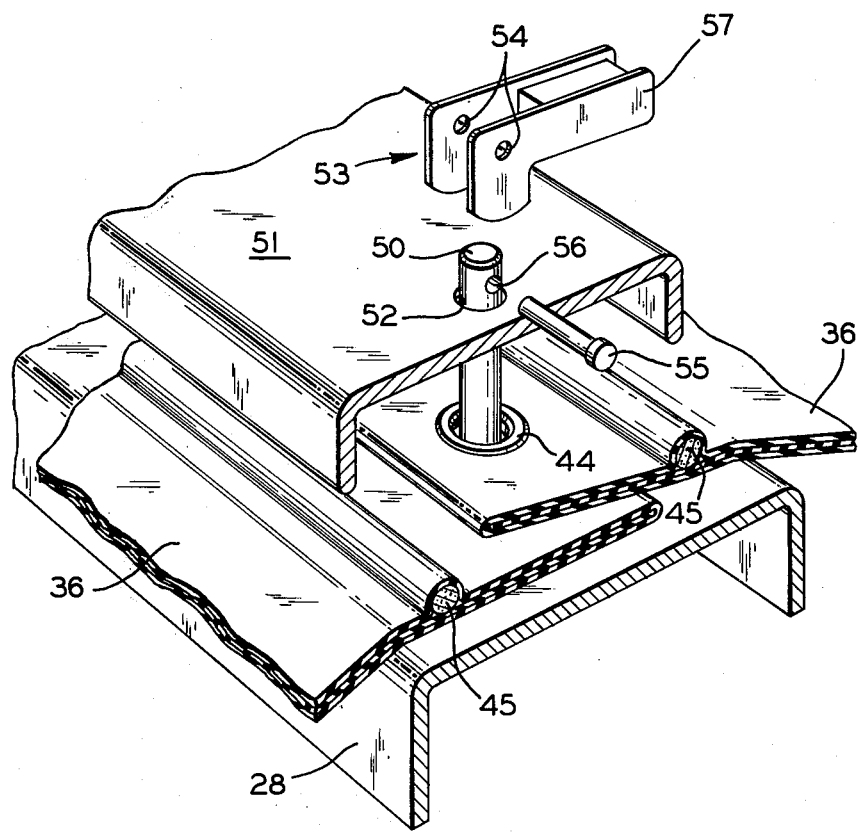
FIG. 7 is a view similar to FIG. 6, but in perspective and exploded to illustrate a preferred way of securing the top margins of the parts of the protective cover in place.

A number of modifications that fall within the scope of the invention have been discussed above and, in FIGS. 10 and 11 there is disclosed a somewhat different form of cover section 61 and the manner in which it functions in connection with a modified form of the clamping or retaining arrangement shown in FIGS. 6 and 7. Thus, in the cover section 61 of FIG. 10, the flap 48a is one of a series of separate, independent flaps extending in aligned, equally spaced relationship across the width of the section. Also the upper margin of the section is made the same as the lower margin, i.e., with a rope core 45a within, but at the extremity of, the sealed together flexible sheets of the margin, to provide an enlarged edge portion thereon; and a long narrow inner flexible sheet 62 is bonded to the inside surface of the section in a manner to also bridge the inner surfaces of the upper and lower inflatable compartments 40a and 41a in the locality of the hinge provided by the transversely sealed area 39a.

Figure 10:
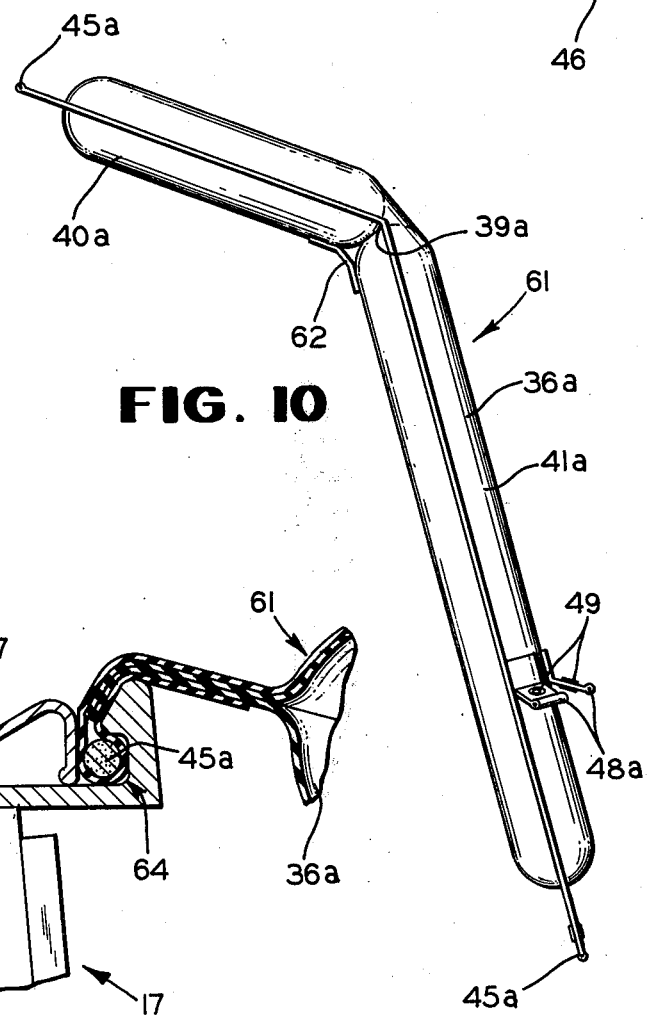
FIG. 10 is a view similar to FIG. 4, but with the upper portion of the cover section swung into angular relation to the lower, and illustrating a modified form of flap and upper marginal portion.
Figure 11:
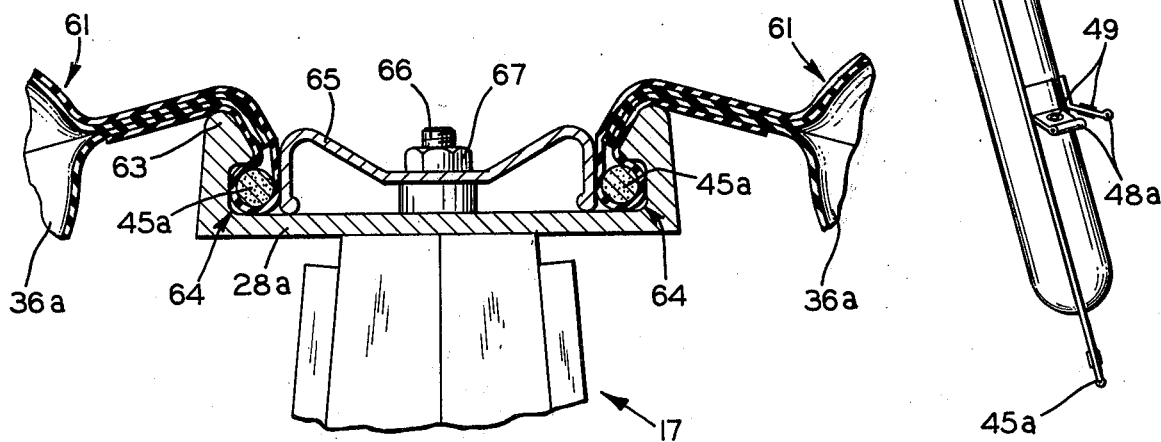
FIG. 11 is a sectional view similar to FIG. 6, but illustrating a modified type of retaining structure for use with covers having upper marginal portions of the character illustrated in FIG. 10.

The cover section 61 of FIG. 10, or any cover section having an upper margin of a similar type, can be employed with the draping and locking means shown in FIG. 11. Thus, in this embodiment, a somewhat different form of channel member 28a is substituted for the inverted supporting and spacing channel 28. More specifically, the channel 28a is formed with flanges 63 that are triangularly shaped in cross section and extend inwardly from the upper extremities of the legs of the channel to provide, with the channel legs and web, recesses 64 that extend along the length of the channel. Any sharp edges on the channel or flanges in the vicinity of the recesses 64 are rounded off; and cover sections 61 are draped from the channel 28a at either side of the car by inserting their enlarged upper edge portions 45a into the recesses 64, and retaining them in place by means of a single, elongated inverted U-shaped locking member 65, or a series of such members. The member or members 65 can be located by means of threaded posts 66 extending upwardly from the channel 28a and adapted to pass upwardly through corresponding openings in the locking member or members 65. The air inflated covers 36a can then be locked, in their draped arrangement from the channel 28a, by threading, and tightening, suitable nuts or the like 67 on the posts 66.

It is to be understood that the forms of the invention herewith shown and described are to be taken as preferred embodiments only of the same and that various changes in the size, shapes and arrangement of parts may be resorted to without departing from the spirit of the invention to be included within the scope of the subjoined claims.

We claimed:

1. The combination: with a goods supporting structure including a goods supporting framework mounted on a vehicle; of a protective cover comprising two flexible sheets arranged in face to face relation and sealed together in selected areas to form substantially flat sealed marginal portions, upper and lower inflatable compartments within said marginal portions and between said sheets, an elongated sealed area separating said compartments and about which sealed separating area said compartments can be swung into and out of angular relationship with one another, means for securing the upper of said marginal portions of said cover to said framework to permit said compartments to be swung into angular relationship and to extend over and into covering relationship to goods supported on said framework, and means for securing the lower of said marginal portions of said cover to one side of said vehicle; and a similar cover with means for securing its upper marginal portion to said framework in overlapping relation to the upper marginal portion of said first mentioned cover and for securing its lower marginal portion to said vehicle at the opposite side thereof from said first mentioned cover.

2. A combination as defined in claim 1, in which said vehicle is a gondola railway car; said supporting framework includes an "A" frame on the floor of said car, bulkheads at the ends of said car that have an outline shape substantially conforming with the cross sectional shape of and are in substantial alignment with said "A" frame, and an elongated separating element located between said bulkheads and over said "A" frame; and means are provided for securing said covers in said overlapping relation to said separating element and for clamping the same thereagainst which include an inverted channel, means for locating said channel with the legs thereof in engagement with the upper marginal portions of said covers, and cam type locking means engagable with the web of said channel to urge the legs thereof toward said separating element.

3. A combination as defined in claim 1, in which said means for securing said upper marginal portions of said covers to said framework include elongated core members within and extending parallel with the upper edges of said upper marginal portions of said covers and forming enlarged portions thereon, an elongated channel member associated with said framework and having flanges extending inwardly from the upper extremities of its legs to form with said channel member recesses for receiving said enlarged portions at said upper marginal edges of said covers, and removable means for retaining and locking said enlarged portions in said recesses.

4. A combination as defined in claim 2, in which a third flexible sheet is arranged in face to face relation to one of said first mentioned sheets and is sealed thereto throughout its entire area except in the vicinity of said elongated sealed area, and a flap provided with a fastening component is carried by said third sheet between said elongated sealed area and said lower marginal portion and extends parallel with said elongated sealed area and outwardly from said third sheet.

* * * * *